Patented Apr. 24, 1934

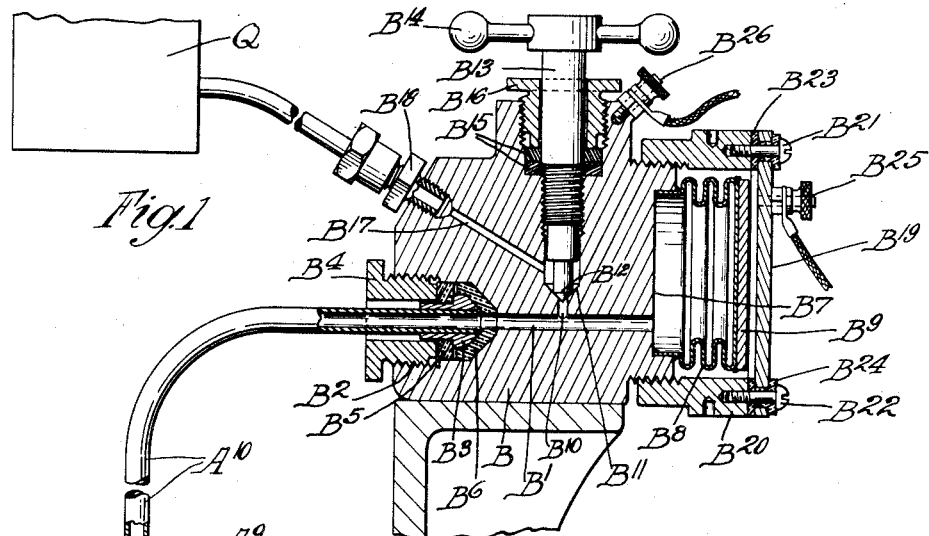
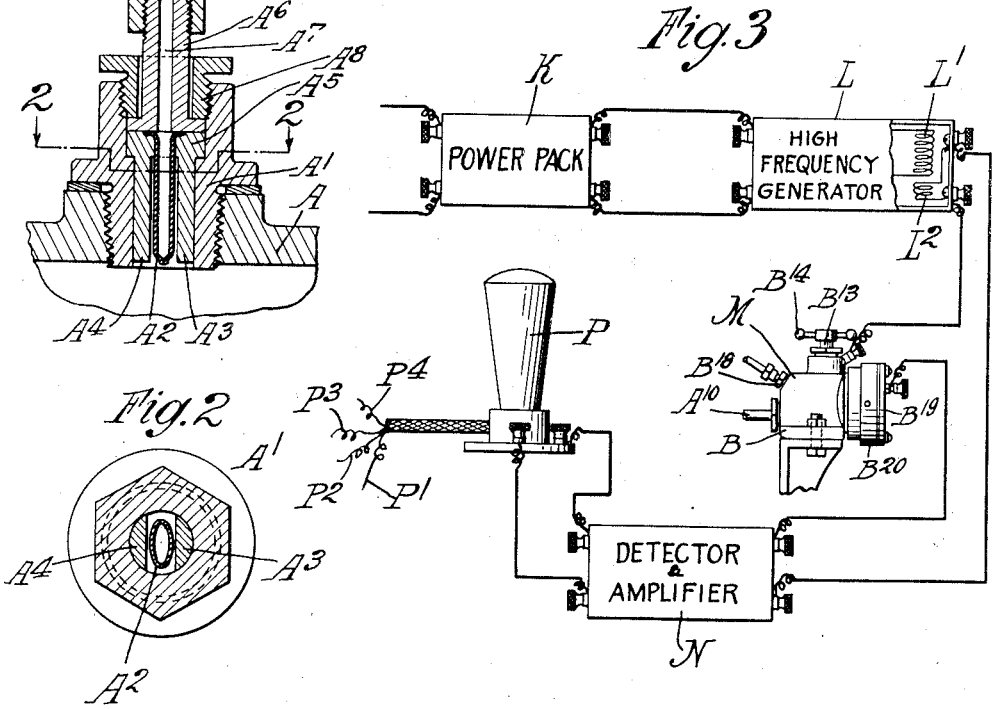

1,956,403

UNITED STATES PATENT OFFICE 1,956,403

HYDRAULIC SYSTEM FOR TRANSMISSION OF PRESSURE OR MOTION

Philip Lane Scott, San Mateo, Calif.

Application December 26, 1930, Serial No. 504,973

13 Claims. (Cl. 175—41.5)

My invention relates to hydraulic systems for the transmission of pressure or motion and is specifically adapted to be used for the purpose of transmitting and translating pressure or motion into fluctuations in an electric circuit.

The device which is the subject of this invention is primarily intended for use in connection with electrical measuring or indicating devices but it may be used wherever it is desired to transmit or translate a motion or a pressure by a hydraulic linkage from one point to another and also where it is desirable to separate or insulate electrically an electrical system from some other system with which the electrical system is associated and which influences the electrical system.

One object of such a device may be to transmit pressure from the cylinder of an internal combustion engine to an electrical element of an electrical measuring device and to translate pressure variations into variations in an electrical current. When so used a pressure sensitive element is inserted in the engine cylinder and the pressure variations acting upon this element affect a liquid column. This liquid column in turn may under certain conditions exert pressure upon a movable or flexible element at some distant point and this movable element may produce changes in an electric circuit as it moves.

It is often desirable to insulate to a substantial degree an electrical system from a mechanical system particularly where the mechanical system may be associated with extraneous electrical phenomena. In this case the interposed liquid column will serve to keep outside electrical disturbances from affecting the principal electric system. In such devices as are to be subjected to heat, expansion will obviously take place in the liquid and provision must be made for compensating for such expansion. The system herein described provides for eliminating substantially the effect of temperature variations upon the liquid column.

My invention is illustrated more or less diagrammatically in the accompanying drawing, wherein—

Figure 1 is the pressure responsive element shown in section;

Figure 2 is a section along the line 2—2 of Figure 1;

Figure 3 is a wiring diagram.

Like parts are indicated by like characters throughout the specification and claims.

Referring to Figure 1, $A^1$ is a housing threaded at one end and adapted to be inserted in or attached to a vessel or chamber A subjected to pressure to be measured. $A^2$ is a thin oval hollow flexible tube, positioned within the bore of the housing $A^1$. A pair of filler blocks $A^3$, $A^4$ are inserted with in the bore of the housing $A^1$ to occupy the unused space. $A^5$ is a support or mounting in which the flexible tube $A^2$ is firmly held. $A^6$ is a hydraulic line connection member which serves also as a cap or closure for the tube $A^2$. It has a hollow central bore $A^7$ permitting communication to the interior of the hollow flexible tube $A^2$. The assembly of the flexible tube $A^2$ and the connecting member $A^6$ is positioned and held tightly by the gland nut $A^8$ screw threaded into the housing $A^1$. $A^9$ is a mating pipe or tube connection for attaching the tube $A^{10}$ to the connection $A^6$.

B is a body member having a bore or channel $B^1$ which is enlarged and threaded at $B^2$ to receive the pipe $A^{10}$. This pipe $A^{10}$ is provided with an enlarged member $B^3$ soldered or brazed thereto which is adapted to be clamped into the bore $B^2$ by means of the gland nut $B^4$. $B^5$ $B^6$ are electrical insulating gaskets which separate this pipe electrically from the rest of the system. The bore $B^1$ communicates with a circular recess $B^7$ within a boss extending from the body. Soldered or brazed within this circular recess is a flexible sylphon bellows $B^8$ closed by a stiff plate or head $B^9$, which also forms one plate of an electrical condenser. Leading from the channel $B^1$ is a channel $B^{10}$ having an enlargement and valve seat at $B^{11}$. Cooperating with this valve seat is the valve head $B^{12}$ mounted upon the stem $B^{13}$. This valve stem is threaded and adapted to be adjusted axially by means of the handle $B^{14}$. It is packed against leakage by means of the packing $B^{15}$ and the gland nut $B^{16}$. Communicating with the space above the passage $B^{10}$ is the passage $B^{17}$ in the end of which is an outlet connection $B^{18}$ adapted to communicate with a supply of liquid for the system. $B^{19}$ is a second rigid condenser plate cooperating with the condenser plate $B^9$. It is fixed to an adjustable cap $B^{20}$ by means of the screws $B^{21}$ and $B^{22}$ and is insulated therefrom electrically by means of the insulating gaskets $B^{23}$ and $B^{24}$. The cap $B^{20}$ is adapted by means of the thread cooperating with the thread on the body B to be positioned axially for initial adjustment of the condenser capacity. $B^{25}$ is an electrical binding post attached to the plate $B^{19}$. $B^{26}$ is an electrical binding post attached to the body B and through metallic contacts maintaining connection with the condenser plate $B^9$.

Figure 3 shows an electric circuit including the electrical end of the pressure transfer system. K is a power pack supplying direct current to a high frequency generator L within which is mounted a generating coil L¹ and the pick up coil L². The pick-up coil L² is connected to the electrically responsive end of the pressure transfer system M and from there is led to the detecting and amplifying system N where the pressure changes caused by the movement of the variable condenser, are detected and amplified to a degree sufficient to influence the cathode ray oscillograph P. The cables P¹ P² P³ and P⁵ leading from the cathode ray oscillograph P may be connected to any convenient source of current to operate the filament within the tube and its associated electric parts and may be connected to other electrical apparatuses which it may be desired to use in conjunction with the pressure transfer system.

Q is a reservoir, communicating with the passage B¹⁷ whereby hydraulic fluid may be permitted to enter the system or may be discharged from the system depending on the conditions therein and controlled by the valve B¹² so that the initial pressure in the system may be adjusted and so that the system may be kept at all times entirely filled with hydraulic fluid preventing the formation of air pockets and the like. By initial pressure or initial positioning of the condenser plates, I mean to short it in desired neutral condition. It may be that owing to expansion and contraction, temperature change and the like, it will be necessary to reset the initial pressure in the system or the initial relation between the condenser plates once and for all or very frequently perhaps between readings but some means must be provided whereby the conditions in the system may be controlled so that when measurements are being taken or pressures are being studied, the system may be brought to a so to speak neutral zone or datum line.

The use and operation of my device are as follows:

The pressure responsive element described is inserted in or attached to a chamber within which is the pressure to be studied. For example, the device shown which is about the size and shape of a spark plug, may be inserted in the spark plug hole in the engine cylinder. It will then respond to pressure changes within the cylinder. A tube of any convenient length is led from this pressure responsive element to the electrically responsive unit which may be closely associated with the rest of the electrical apparatus. The pressure increment within the chamber of the engine cylinder is transmitted first to the liquid within the pressure responsive unit attached to the chamber and then by means of this liquid through the piping and into the elastic element within the electrically responsive unit. Considering any given pressure level as existing in the chamber and assuming that a pressure rise occur the elastic tube of the pressure responsive unit will collapse slightly, force liquid along the tube and, if the by-pass valve within the electrically responsive unit is closed, this liquid having no outlet, will cause the elastic element to respond. As this elastic element flexes outwardly it will cause the movable condenser plate to approach the fixed condenser plate, thereby increasing the capacity of the condenser and increasing the flow of current through it. The function of the by-pass valve is to permit the filling of the system and maintenance of the liquid within the system at all times and further to avoid the effect of expansion within the liquid column due to temperature changes. When the device is put in operation in an engine for example, and the engine warms up, the liquid within the system tends to expand. During such times the by-pass valve is left open and the electrical side of the system is inoperative. The liquid then merely surges to and from a supply tank which is directly connected to the by-pass outlet. When it is desired to take a reading, the needle valve is closed, completely closing the liquid system, and compelling a displacement at one point in the system to be balanced by an equal displacement of opposite sign at some other point. Specifically when the flexible tube at one end is collapsed by pressure, the flexible bellows at the other end must expand. When the reading has been obtained the by-pass valve is again opened. It will be seen that the short time during which the valve is closed to obtain a reading will be too short for any appreciable temperature effect to take place. It will also be noted that this construction permits the complete electrical isolation of the electrical circuit from any electrical interference of the engine. This remote operating pressure transfer system is for use particularly in connection with electrical indicators. There is a source of high frequency energy generated in any convenient manner, which energy is passed through the condenser plates and the electrical end of the transfer mechanism. The motion of these plates to and fro changes the capacity. This change in capacity causes change in the current flowing. This change in the current flowing is amplified in any convenient manner and is caused to influence some recording device. A cathode ray oscillograph is shown as such a device.

I claim:

1. In combination, a plurality of opposed insulated condenser plates, a bellows support for one of them, a flexible walled chamber adapted to be exposed to varying pressure and a hydraulic connection between it and the bellows, and means for varying the amount of hydraulic fluid contained within the system to provide an initial adjustment.

2. In combination, a plurality of opposed insulated condenser plates, a support for one of them comprising a hydraulic chamber variable in dimensions responsive to variations in pressure and adapted to displace the plate associated therewith when the chamber dimensions vary, a flexible walled chamber adapted to be exposed to varying pressure and a hydraulic connection between it and the hydraulic chamber, and means for varying the amount of hydraulic fluid contained within the system to provide an initial adjustment.

3. In combination, a plurality of opposed insulated condenser plates, a bellows support for one of them, a flexible walled chamber adapted to be exposed to varying pressure and a hydraulic connection between it and the bellows, the hydraulic connection being insulated from the bellows, and means for varying the amount of hydraulic fluid contained within the system to provide an initial adjustment.

4. In combination, a plurality of opposed insulated condenser plates, a support for one of them comprising a hydraulic chamber variable in dimensions responsive to variations in pressure and adapted to displace the plate associated therewith when the chamber dimensions vary, a flexible walled chamber adapted to be exposed to varying pressure and a hydraulic connection between it and the hydraulic chamber, the hydraulic connection being insulated from the hydraulic chamber, and means for varying the amount of hydraulic fluid contained within the system to provide an initial adjustment.

5. In combination, a plurality of opposed insulated condenser plates, a hydraulic vessel, one wall of which is connected to one condenser plate and is free to move responsive to internal pressure, another wall of which is free to move responsive to external pressure, and means for varying the amount of hydraulic fluid contained within the vessel to provide an initial adjustment.

6. In combination, a plurality of opposed insulated condenser plates, a bellows support for one of them, a flexible walled chamber adapted to be exposed to varying pressure and a hydraulic connection between it and the bellows, and additional means for adjusting the initial pressure in the system.

7. In combination, a plurality of opposed insulated condenser plates, a hydraulic vessel, one wall of which is connected to one condenser plate and is free to move responsive to internal pressure, another wall of which is free to move responsive to external pressure, and additional means for adjusting the initial pressure in the system.

8. In combination, a plurality of opposed insulated condenser plates, a bellows support for one of them, a flexible walled chamber adapted to be exposed to varying pressure and a hydraulic connection between it and the bellows, a liquid reservoir, a connection between it and the system whereby the system may be maintained at all times completely filled with hydraulic fluid.

9. In combination, a plurality of opposed insulated condenser plates, a hydraulic vessel, one wall of which is connected to one condenser plate and is free to move responsive to internal pressure, another wall of which is free to move responsive to external pressure, a liquid reservoir, a connection between it and the system whereby the system may be maintained at all times completely filled with hydraulic fluid.

10. In combination, a flexible walled member adapted to be exposed to varying pressures in a pressure containing chamber, a closed relatively rigid conduit communicating with such flexible walled member, a plurality of condenser plates, one of them fixed, another movable, an expansible chamber associated with one of said plates and communicating with the conduit whereby variation in the pressure on the flexible walled member will be transmitted hydraulically through the conduit to the expansible chamber to vary the distance between the condenser plates.

11. In combination, a flexible walled member adapted to be exposed to varying pressures in a pressure containing chamber, a closed relatively rigid conduit communicating with such flexible walled member, a plurality of condenser plates, one of them fixed, another movable, an expansible chamber associated with one of said plates and communicating with the conduit whereby variation in the pressure on the flexible walled member will be transmitted hydraulically through the conduit to the expansible chamber to vary the distance between the condenser plates, means for varying the amount of liquid contained within the system to provide an initial adjustment of the distance between the condenser plates.

12. In combination, a flexible walled member adapted to be exposed to varying pressures in a pressure containing chamber, a closed relatively rigid conduit communicating with such flexible walled member, a plurality of condenser plates, one of them fixed, another movable, an expansible chamber associated with one of said plates and communicating with the conduit whereby variation in the pressure on the flexible walled member will be transmitted hydraulically through the conduit to the expansible chamber to vary the distance between the condenser plates.

13. In combination, a flexible walled member adapted to be exposed to varying pressures in a pressure containing chamber, a closed relatively rigid conduit communicating with such flexible walled member, a plurality of condenser plates, one of them fixed, another movable, an expansible chamber associated with one of said plates and communicating with the conduit whereby variation in the pressure on the flexible walled member will be transmitted hydraulically through the conduit to the expansible chamber to vary the distance between the condenser plates, a reservoir, a connection between it and the hydraulic system whereby the system may be maintained at all times entirely filled with liquid.

PHILIP LANE SCOTT.